(12) United States Patent
Wang et al.

(10) Patent No.: US 10,878,461 B2
(45) Date of Patent: Dec. 29, 2020

(54) MULTIMEDIA INFORMATION PROCESSING METHOD, APPARATUS, AND DEVICE, AND STORAGE MEDIUM

(71) Applicant: TENCENT TECHNOLOGY (SHENZHEN) COMPANY LIMITED, Shenzhen (CN)

(72) Inventors: Qian Wang, Shenzhen (CN); Qi Jin, Shenzhen (CN); Chenjun Yang, Shenzhen (CN); Zhengyun Chen, Shenzhen (CN); Can Zheng, Shenzhen (CN); Junliang Chen, Shenzhen (CN); Wenji Li, Shenzhen (CN); Xiaolu Zhang, Shenzhen (CN); Shaogang Tang, Shenzhen (CN); Huijuan Li, Shenzhen (CN); Yikun Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 112 days.

(21) Appl. No.: 16/240,531

(22) Filed: Jan. 4, 2019

(65) Prior Publication Data

US 2019/0139100 A1    May 9, 2019

Related U.S. Application Data

(63) Continuation of application No. PCT/CN2017/107719, filed on Oct. 25, 2017.

(30) Foreign Application Priority Data

Oct. 27, 2016 (CN) .......................... 2016 1 0951207

(51) Int. Cl.
*G06Q 30/02* (2012.01)
*G06T 7/90* (2017.01)
*G06F 16/955* (2019.01)

(52) U.S. Cl.
CPC ..... *G06Q 30/0276* (2013.01); *G06F 16/9554* (2019.01); *G06Q 30/0267* (2013.01); *G06Q 30/0277* (2013.01); *G06T 7/90* (2017.01)

(58) Field of Classification Search
CPC .......... G06Q 30/0267; G06Q 30/0276; G06Q 30/0277; G06Q 30/0251; G06T 7/90
(Continued)

(56) References Cited

U.S. PATENT DOCUMENTS 10,096,169 B1 * 10/2018 Chenillo ................ G06N 20/00
2003/0046157 A1    3/2003 Prorock
(Continued)

FOREIGN PATENT DOCUMENTS

CN    102708503 A    10/2012
CN    102799920 A    11/2012
(Continued)

OTHER PUBLICATIONS

Zebra.com, What Are Barcodes Used for?, downloaded Oct. 21, 2020 from https://www.zebra.com/us/en/resource-library/faq/barcode-scanning/what-are-barcodes-used-for.html (Year: 2020).*
(Continued)

*Primary Examiner* — Scott D Gartland
(74) *Attorney, Agent, or Firm* — Oblon, McClelland, Maier & Neustadt, L.L.P.

(57) ABSTRACT

Embodiments of the present disclosure disclose a method and an apparatus. The apparatus includes interface circuitry and processing circuitry. The processing circuitry obtains attribute information of multimedia information associated with a multimedia provider. The attribute information
(Continued)

includes website information of a website used to display the multimedia information and identifier (ID) information associated with the multimedia information. The processing circuitry generates a machine-readable identification code to be scanned by a user device of a user based on at least the website information. Based on the ID information, the processing circuitry obtains a first image corresponding to the multimedia information. The processing circuitry determines an image area in the first image in which the machine-readable identification code is to be inserted. The processing circuitry inserts the machine-readable identification code into the image area to generate a second image. The interface circuitry sends the second image to the multimedia provider.

20 Claims, 12 Drawing Sheets

(58) Field of Classification Search
USPC .................. 705/14.64, 14.72, 14.73, 14.49
See application file for complete search history.

(56) References Cited

U.S. PATENT DOCUMENTS

| | | | | |
|---|---|---|---|---|
| 2008/0172362 | A1* | 7/2008 | Shacham | G06F 16/35 |
| 2008/0172374 | A1* | 7/2008 | Wolosin | G06F 16/9537 |
| 2011/0258031 | A1* | 10/2011 | Valin | G06Q 40/12 |
| | | | | 705/14.39 |
| 2012/0036015 | A1* | 2/2012 | Sheikh | G06Q 30/0261 |
| | | | | 705/14.54 |
| 2015/0379751 | A1* | 12/2015 | Raichelgauz | H04N 21/8106 |
| | | | | 382/100 |
| 2017/0076262 | A1* | 3/2017 | Xing | G06Q 30/0267 |
| 2017/0140190 | A1 | 5/2017 | Xu et al. | |
| 2017/0195828 | A1* | 7/2017 | Yau | G06Q 30/0267 |

FOREIGN PATENT DOCUMENTS

| | | |
|---|---|---|
| CN | 103412891 A | 11/2013 |
| CN | 103870861 A | 6/2014 |
| CN | 103886548 A | 6/2014 |
| CN | 103956128 A | 7/2014 |
| CN | 104618663 A | 5/2015 |
| CN | 104917764 A | 9/2015 |
| CN | 106504025 A | 3/2017 |

OTHER PUBLICATIONS

Chinese Office Action dated Mar. 20, 2020 in Chinese Patent Application No. 20161095120.6 w/partial English translation, 8 pages.
International Search Report dated Jan. 30, 2018 in PCT/CN2017/107719, with English translation.
Written Opinion dated Jan. 30, 2018 in PCT/CN2017/107719.

* cited by examiner

MULTIMEDIA INFORMATION PROCESSING METHOD, APPARATUS, AND DEVICE, AND STORAGE MEDIUM

RELATED APPLICATION

This application is a continuation of International Application No. PCT/CN2017/107719, filed on Oct. 25, 2017, which claims priority to Chinese Patent Application No. 201610951207.6, filed on Oct. 27, 2016. The entire disclosures of the prior applications are hereby incorporated by reference in their entirety.

FIELD OF THE TECHNOLOGY

The present disclosure relates to multimedia technologies.

BACKGROUND OF THE DISCLOSURE

The development of the mobile Internet industry of China drives the development of the mobile advertising industry. An advertising service is considered as the most active engine in the Internet economy. Mobile Internet advertising (mobile advertising for short), as the most important part of Internet advertising, is an advertising form based on a wireless communications technology and using a mobile terminal as a carrier.

When an advertiser needs to push an advertisement, the advertiser needs to find an advertising creative template to make an advertisement. Generally, an advertising platform side further provides a large quantity of creative templates and uses complete editing tools, to improve a creative making capability of the advertiser, and improve a creative effect. However, except for providing creative making tools, the advertising platform side still provides no complete front-end optimized creative display manner. There is still an absence of intelligent creative display based on an advertisement playback scenario, an audience or a user, and landing page content information at present. It may be learned that, the following problems exist in a related technology: for example, an intelligent creative platform accesses only to a creative provided by a supplier, has limited capability of supplying a creative by itself and optimizing the creative, and displays only a fixed advertising creative instead of performing intelligent optimization in combination with an advertisement playback scenario, user information, and landing page content information.

SUMMARY

In view of this, to resolve at least one problem that exists in the related technology, embodiments of the present disclosure provide a multimedia information processing method, apparatus, and device, and a storage medium, to provide landing page content information to a user in a cross-terminal multimedia form, so as to maximize value of mobile traffic.

The technical solutions in the embodiments of the present disclosure are implemented as follows:

According to aspects of the disclosure, a method and an apparatus for processing multimedia information are provided. For example, the apparatus includes interface circuitry and processing circuitry. In some embodiments, the processing circuitry obtains attribute information of the multimedia information associated with a multimedia provider. The attribute information includes website information of a website used to display the multimedia information and identifier (ID) information associated with the multimedia information. The processing circuitry generates a machine-readable identification code to be scanned by a user device of a user based on at least the website information. Based on the ID information, the processing circuitry obtains a first image corresponding to the multimedia information. The processing circuitry determines an image area in the first image in which the machine-readable identification code is to be inserted. The processing circuitry inserts the machine-readable identification code into the image area to generate a second image. The interface circuitry sends the second image to the multimedia provider.

In some embodiments, the interface circuitry receives a first request for the second image from the multimedia provider. The first request includes the attribute information. The apparatus obtains the attribute information from the first request.

In some embodiments, the apparatus generates a first response to the first request, and sends the first response to the multimedia provider. The first response includes the second image.

In some embodiments, the processing circuitry performs color identification on the first image, and obtains an empty window area in the first image based on the color identification. In some examples, the empty window area does not include characters. Color differences of pixels in the empty window area are within a threshold range. The processing circuitry selects the empty window area to be the image area in the first image.

In some embodiments, the apparatus obtains landing page information of the website and playback scenario information for playback of the multimedia information. Then, the processing circuitry generates the website information based on the landing page information and the playback scenario information.

In some embodiments, the apparatus receives a second request from the multimedia provider. The second request is used to deliver the multimedia information. In response to the second request, the apparatus generates first delivery request that includes the first image and a corresponding first delivery rule and sends the first delivery request to a multimedia delivery platform that delivers the multimedia information. The first delivery rule indicates that the first image is to be delivered to the user device. Further, in response to the second request, the apparatus generates a second delivery request that includes the second image and a corresponding second delivery rule and sends the second delivery request to the multimedia delivery platform. The second delivery rule indicates that the second image is to be delivered to a display device.

In some embodiments, the apparatus receives an access request from the user. The access request includes the website information corresponding to the machine-readable identification code. The apparatus obtains information to be displayed from the website based on the website information. The information to be displayed is related to the multimedia information. The apparatus sends the information to be displayed to the user.

In some embodiments, a number of the pixels in the empty window area is larger than a preset threshold.

In some embodiments, the machine-readable identification code is a two-dimensional barcode. Further, the processing circuitry generates the two-dimensional barcode based on a Uniform Resource Locator (URL) that includes a subject ID parameter and a placement ID parameter. The subject ID parameter includes landing page information of the website. The placement ID parameter includes playback scenario information for playback of the multimedia information.

Aspects of the disclosure also provide a non-transitory computer-readable storage medium storing instructions which when executed by a computer cause the computer to perform the method for processing the multimedia information.

The embodiments of the present disclosure provide the multimedia information processing method, apparatus, and device, and the storage medium, where attribute information of multimedia information is obtained, the attribute information of the multimedia information including at least website information used to display the multimedia information, and ID information of the multimedia information; an image identification code is generated according to at least the website information in the attribute information; a first image corresponding to the multimedia information is obtained according to the ID information of the multimedia information; the first image is analyzed, to obtain an image area used to display the image identification code; the image identification code is added to the image area of the first image, to generate a second image; and the second image is sent to a multimedia demand side. In this way, landing page content information is provided to a user in a cross-terminal multimedia form, so as to maximize value of mobile traffic.

BRIEF DESCRIPTION OF THE DRAWINGS

FIG. 1-2 is a second schematic diagram of an Internet advertising industry chain in a related technology;

FIG. 2-1 is a schematic implementation flowchart of a multimedia information processing method according to an embodiment of the present disclosure;

FIG. 2-2 is a first schematic diagram of comparison between a first image and a second image according to an embodiment of the present disclosure;

FIG. 2-3 is a second schematic diagram of comparison between a first image and a second image according to an embodiment of the present disclosure;

FIG. 3-1 is a schematic diagram of an audience change in the era of mobile Internet;

FIG. 3-2 is a schematic implementation flowchart of a multimedia information processing method according to an embodiment of the present disclosure;

FIG. 3-3 is a schematic diagram of a scenario according to an embodiment of the present disclosure;

FIG. 3-4 is a schematic diagram of a front-end creative display style according to an embodiment of the present disclosure;

FIG. 3-5 is a schematic diagram of a position relationship between an empty window area and a main area according to an embodiment of the present disclosure;

FIG. 3-6 is a schematic implementation flowchart of a closed loop of a creative, media, and a user according to an embodiment of the present disclosure;

FIG. 3-7 is a schematic diagram of generating a two-dimensional barcode according to an embodiment of the present disclosure;

FIG. 4 is a schematic structural diagram of a multimedia information processing apparatus according to an embodiment of the present disclosure; and FIG. 5 is a schematic structural diagram of a computing device according to an embodiment of the present disclosure.

DESCRIPTION OF EMBODIMENTS

Figure 1:
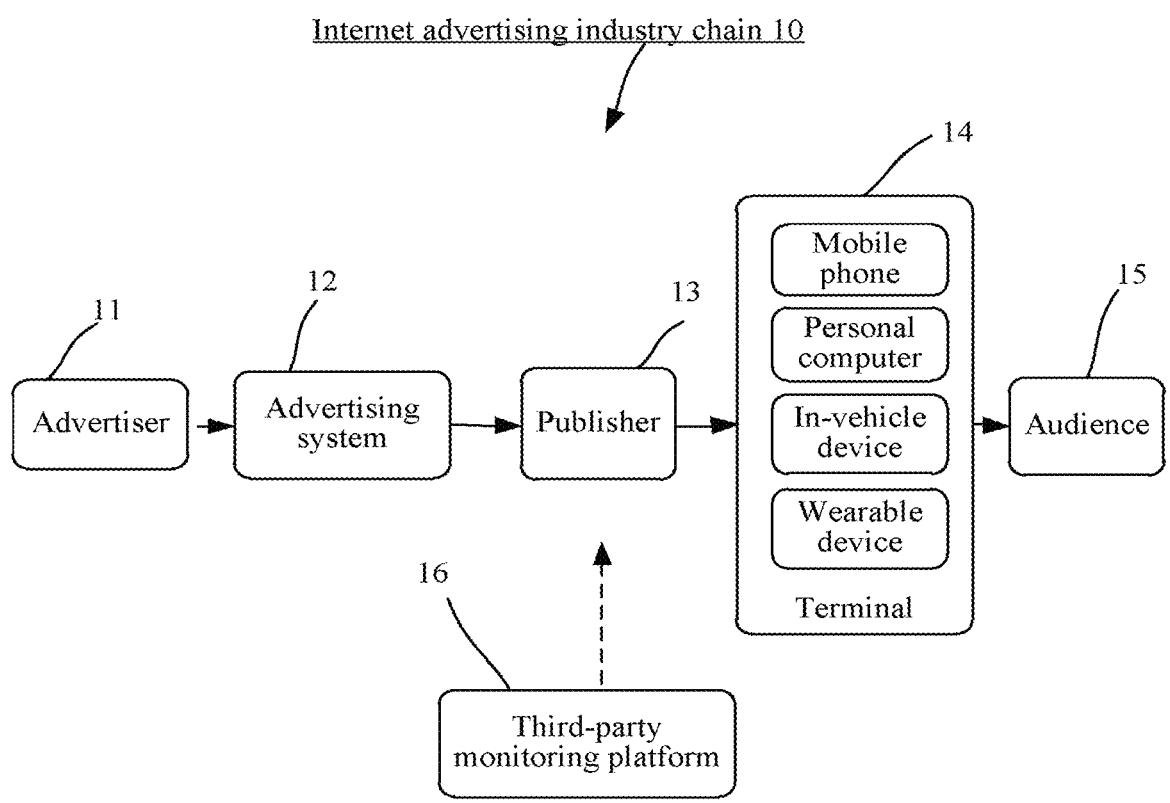
FIG. 1-1 is a first schematic diagram of an Internet advertising industry chain in a related technology.

FIG. 1-1 is a schematic diagram of an Internet advertising industry chain in a related technology. As shown in FIG. 1-1, the Internet advertising industry chain 10 includes an advertiser 11, an advertising system 12, a publisher (for example, media) 13, a terminal 14, an audience (a user) 15, and a third-party monitoring platform 16. The advertising system 12 is an intermediary between the advertiser 11 and the publisher 13. When the advertiser 11 needs to expose an advertisement, the advertiser pays an economic price for displaying the to-be-exposed advertisement on the advertising system 12. When displaying the to-be-exposed advertisement, the advertiser 11 often selects some push conditions, for example, an audience, a playback manner, a charging manner, and a publisher to which the advertisement needs to be pushed. The advertising system 12 determines, according to a push condition that is set by the advertiser 11, the publisher 13 to which pushing is to be performed, and then, displays the to-be-exposed advertisement to the publisher. When the user 15 uses a product of the publisher (for example, watches a video), the user 15 receives the advertisement by using the terminal 14 such as a mobile phone, a tablet computer, or a personal computer (PC), to expose the advertisement of the advertiser.

Figures 1, 2:
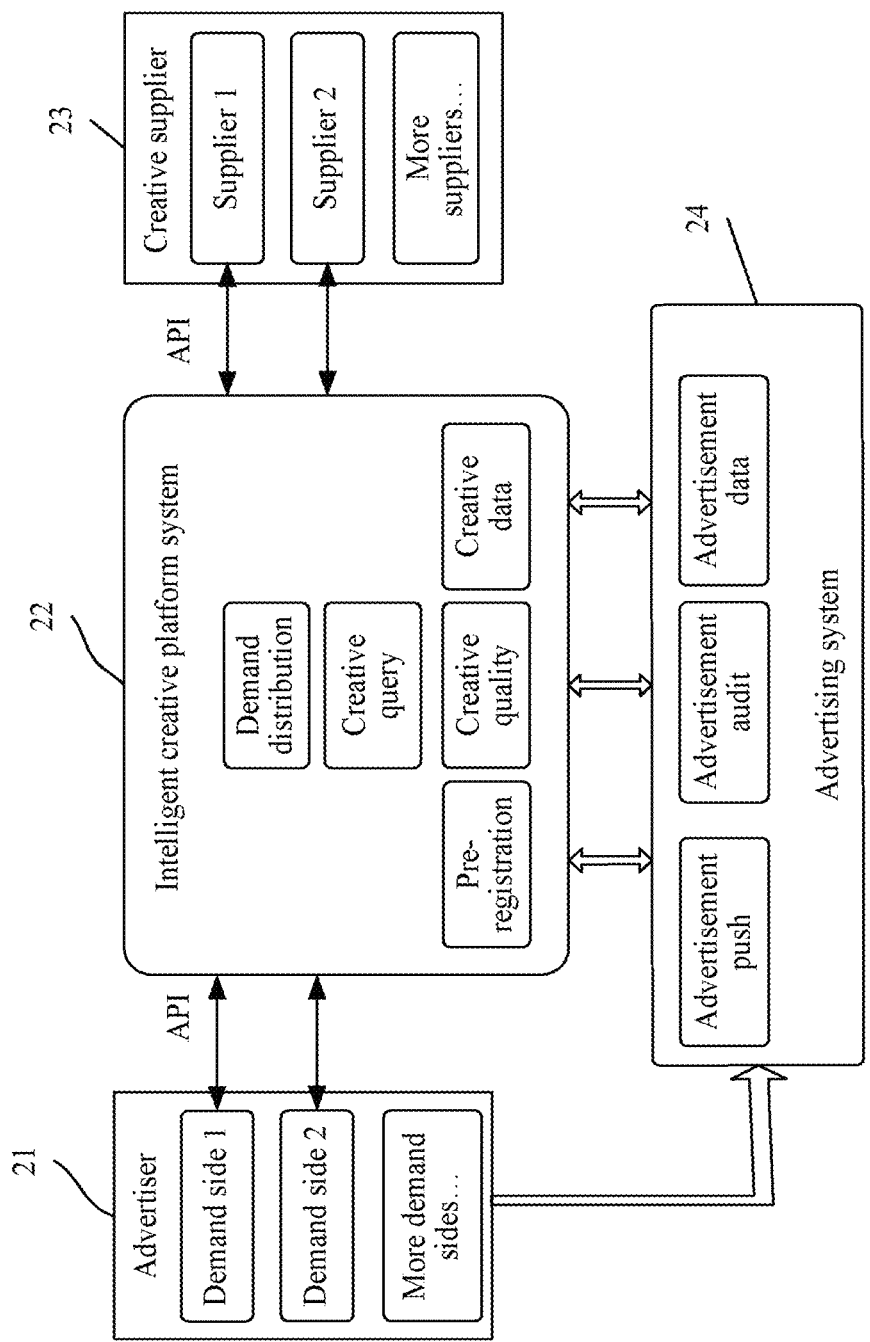

When an advertiser needs to push an advertisement, the advertiser needs to find an advertising creative template to make an advertisement. Generally, an advertising platform side (including at least an advertising system, and in the present disclosure, the advertising platform side includes an intelligent creative platform 22 and an advertising system 24) further provides a large quantity of creative templates and uses complete editing tools, to improve a creative making capability of the advertiser, and improve a creative effect. However, except for providing creative making tools, the advertising platform side still provides no complete front-end optimized creative display manner. There is still an absence of intelligent creative display based on an advertisement playback scenario, an audience, and landing page content information at present. In the related technology, the advertising platform side further provides the intelligent creative platform. As shown in FIG. 1-2, the advertising industry chain includes an advertiser 21, the intelligent creative platform 22, a creative supplier 23, and the advertising system 24. Compared with FIG. 1-1, the advertising industry chain is further integrated with the intelligent creative platform 22 and the creative supplier 23. The intelligent creative platform 22 acquires a creative demand from the advertiser 21, and distributes the creative demand to the creative supplier 23. After the creative supplier 23 generates a creative and is subject to a series of mechanisms such as contention, the creative supplier 23 returns the creative to the advertiser 21. Then, the advertiser 21 pushes the creative on the advertising system 24. It may be learned from FIG. 1-2 that, the following problems exist in the related technology: (1) An intelligent creative platform accesses only to a creative provided by a supplier and has no capability of supplying a creative by itself and optimizing the creative, and an association relationship between an advertising creative and an advertisement playback scenario, an audience, and landing page content information is not established. (2) A source of creative content of the intelligent creative platform is single (provided only by a creative supplier), and a creative form is single, has a poor effect, and needs to be optimized. (3) Only a fixed advertising creative is displayed instead of performing intelligent optimization in combination with an advertisement playback scenario, user information, and landing page content information.

The technical solutions of the present disclosure are further described in detail below with reference to the accompanying drawings and specific embodiments.

An embodiment of the present disclosure provides a multimedia information processing method, applied to the intelligent creative platform shown in FIG. 1-2. During implementation, the intelligent creative platform may be implemented by using a computing device. In other words, a function implemented in the method may be implemented by invoking program code by a processor in the computing device. Certainly, the program code may be stored in a computer storage medium. It may be learned that, the computing device includes at least the processor and the storage medium. During implementation, the computing device may be various types of electronic devices having an information processing capability, for example, the electronic device may be implemented by using a mobile phone, a tablet computer, a desktop computer, or a server cluster.

FIG. 2-1 is a schematic implementation flowchart of a multimedia information processing method according to an embodiment of the present disclosure. As shown in FIG. 2-1, the method includes the following steps:

In step S201, an intelligent creative platform obtains attribute information of multimedia information, the attribute information of the multimedia information including at least website information of a website used to display the multimedia information, and identifier (ID) information of the multimedia information. The website information may be address information on an Internet web page, for example, uniform resource locator (URL) information. The ID information may be implemented by using a multimedia number.

Herein, the multimedia information may be in a form of an advertisement picture, an advertisement video, or the like. A frame of picture in the advertisement picture or the advertisement video is collectively referred to as an image, and the picture includes a photo or may be a composite image.

In step S202, the intelligent creative platform generates an image identification code (or a machine-readable identification code) according to at least the website information in the attribute information. In some embodiments, the machine-readable identification code is to be scanned by a user device of a user.

Herein, the image identification code includes at least a two-dimensional barcode or another identification code. A two-dimensional barcode records, in black and white figures distributed on a two-dimensional plane, data and symbol information by using specific geometric figures based on a particular law. In terms of coding, the two-dimensional barcode skillfully uses the concepts of bit streams of 0 and 1 that constitute the logic base in a computer, uses several geometric figures corresponding to a binary system to indicate word and numeral information, and is automatically identified and read by an image input device or an optoelectronic scanning device, to automatically process information.

In step S203, the intelligent creative platform obtains, according to the ID information of the multimedia information, a first image corresponding to the multimedia information.

Herein, the first image may be an image in an advertising creative returned by a creative supplier. An advertisement or an advertising creative may be in a form of a picture, a video, or the like. When the advertising creative or the advertisement uses a form of a video, the first image may be a frame of image in the video. Generally, the first image uses the last frame in the video. Certainly, the first image may be another frame other than the last frame in the video, for example, the first frame.

In step S204, the intelligent creative platform analyzes the first image, to obtain an image area used to display the image identification code. In some embodiments, the image area is in the first image.

In step S205, the intelligent creative platform adds (or inserts) the image identification code to the image area of the first image, to generate a second image. In some embodiments, the second image includes the machine-readable identification code, such as a two-dimensional barcode.

Herein, the second image includes the two-dimensional barcode, that is, the second image is obtained through composition according to the generated two-dimensional barcode and the first image. The second image may be improvement made by the intelligent creative platform to the advertising creative provided by the creative supplier.

In step S206, the intelligent creative platform sends the second image to a multimedia demand side (or a multimedia provider).

Herein, the first image and the second image in this embodiment are described. In this embodiment, regardless of whether an advertising creative that is not published is embodied in a form of a picture or a form of a video, in this embodiment, an image (a first image) is obtained from the advertising creative, and then, a two-dimensional barcode is added to the image, to obtain an output image (a second image). Note that, a picture or a video (that is, an advertisement that is not published) returned by the creative supplier is referred to as an advertising creative in this embodiment. If the advertising creative is used by the multimedia demand side and published on the advertising platform, a picture or a video viewed by an advertisement audience is referred to as an advertisement.

Figures 1, 2:
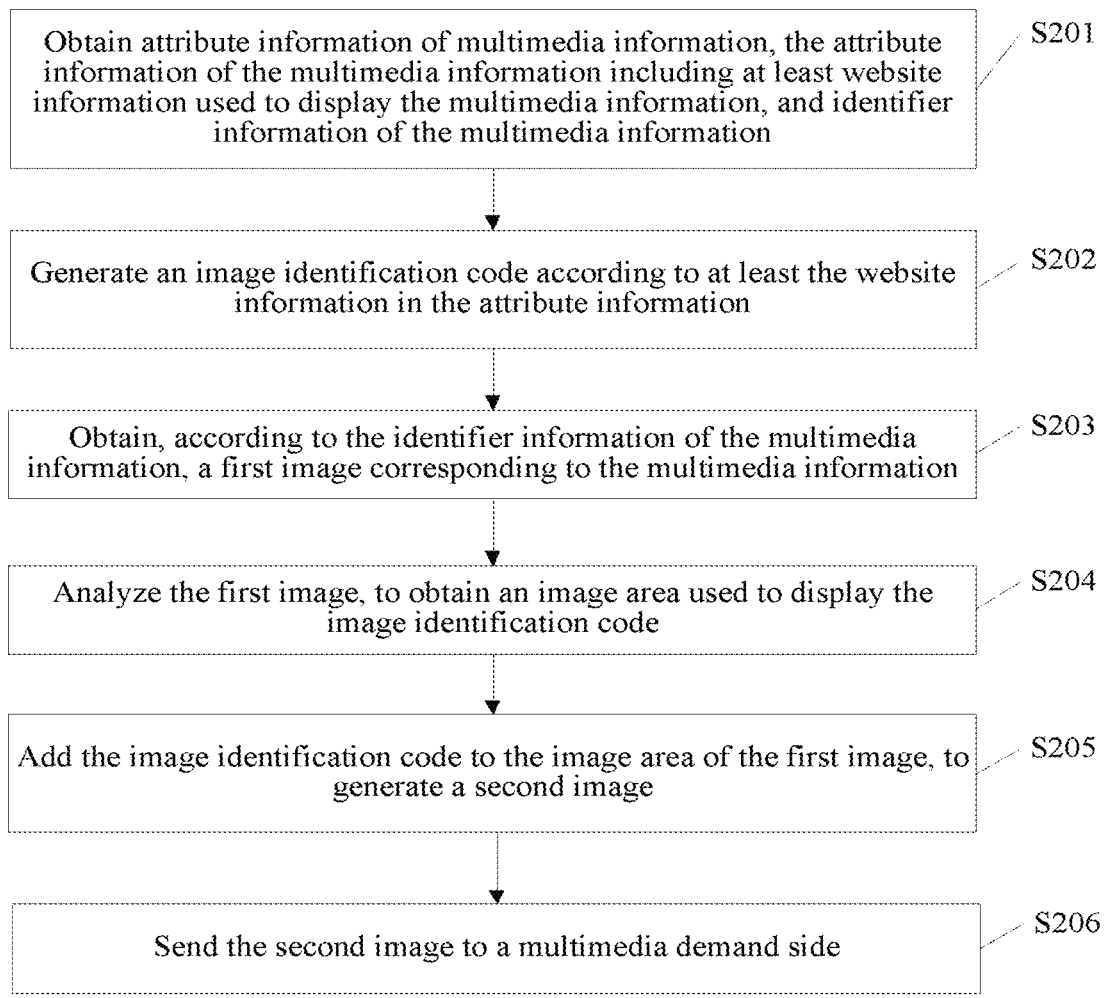
Figure 2:
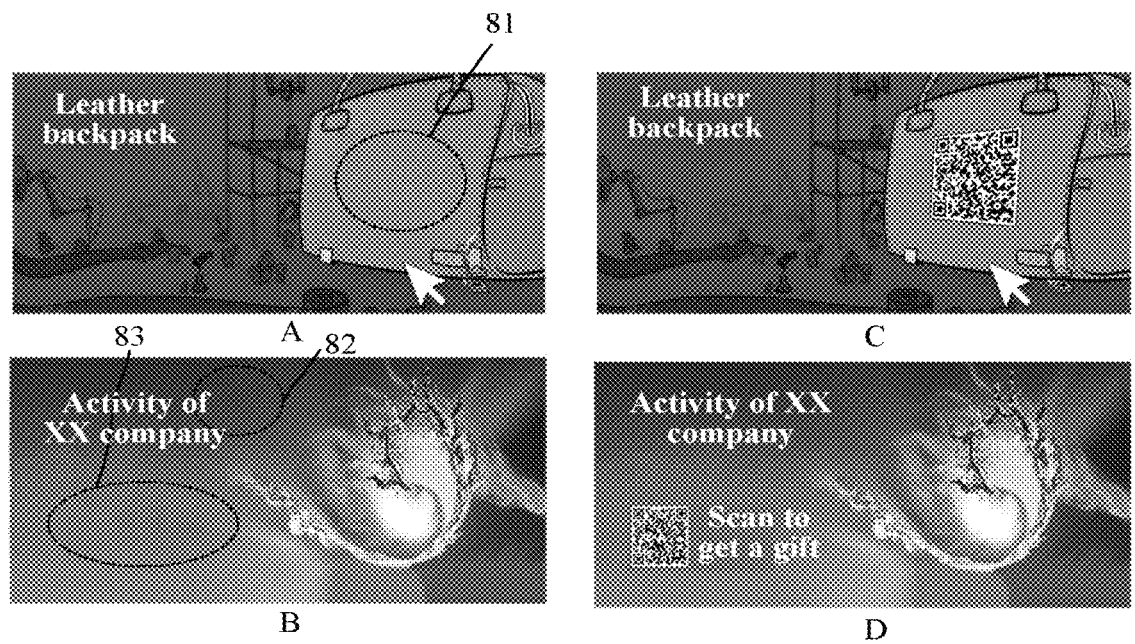
Figures 2, 3:
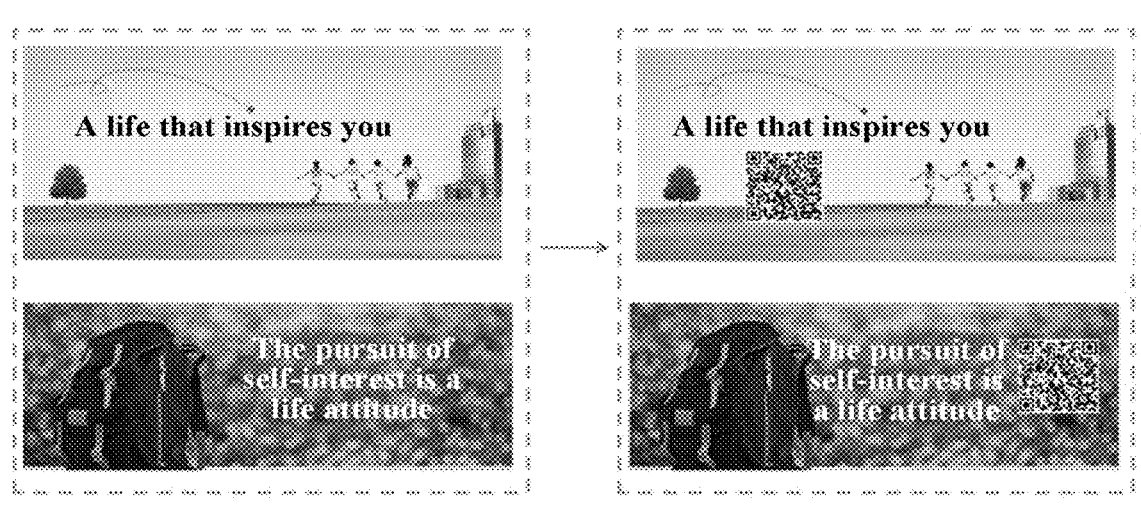

Herein, the multimedia demand side may be an advertiser. As shown in FIG. 2-2, in FIG. 2-2, an image A and an image B on the left are first images, and in FIG. 2-2, C on the right is a second image corresponding to the image A, and an image D on the right is a second image corresponding to the image B. Further, as shown in FIG. 2-3, two images on the left in FIG. 2-3 are first images, and two images on the right in FIG. 2-3 are respectively second images corresponding to the two images on the left. Finally, the intelligent platform returns, to the multimedia demand side, the image C and the image D to which a two-dimensional barcode is added.

In this embodiment of the present disclosure, the first image generally uses the last frame in the video because when the video is completely played back, a display interface of a terminal stays in the last frame. In addition, to provide enough time for a user to identify the two-dimensional barcode, the last frame may be displayed for a relatively long time. For example, a preset display time for the last frame may be 1 minute (min) or 2 min. In this way, there is enough time for the user to take out a mobile terminal to scan the two-dimensional barcode. A person skilled in the art should understand that, certainly, the first image may be another frame other than the last frame in the video, for example, the first frame. During implementation, the first image is played back for a longer time, so that the user can have enough time to scan the two-dimensional barcode.

This embodiment of the present disclosure provides a new cross-terminal advertising form for an advertiser and an advertisement audience: A two-dimensional barcode is generated according to website information of a multimedia demand side, and then, is intelligently spliced into a first image, to form a second image; and the two-dimensional barcode is displayed on an advertising creative, so that the advertisement audience can scan the two-dimensional barcode, to implement interaction in cross-terminal advertisement information tracking. Such a cross-terminal direct information transmission manner can also reduce a customer churn in cross-terminal advertising interaction, and finally improve effect conversion data such as an advertisement effect conversion rate (CVR) and a return on investment (ROI). In addition, traffic resources of multiple terminals are fully used, to maximize value of the traffic, thereby improving overall incomes of an advertising system.

In another embodiment of the present disclosure, before step S201, the method further includes step S207, in which the intelligent creative platform receives a first request sent by the multimedia demand side, where the first request carries the attribute information of the multimedia information, and the first request is used to request an image including the image identification code. Correspondingly, step S201 includes: in response to the first request, obtaining, by the intelligent creative platform, the attribute information of the multimedia information; and step S206 includes: adding, by the intelligent creative platform, the second image to a first response, and sending the first response to the multimedia demand side.

In another embodiment of the present disclosure, step S204 of analyzing the first image, to obtain an image area used to display the image identification code includes:

In step S241, perform color identification on the first image, to obtain an empty window area of the first image.

In step S242, determine the empty window area as the image area.

Herein, the empty window area is a color consistency area excluding words (or characters). The color consistency area may be implemented by means of color identification, for example, a pixel area whose color difference is within a threshold range may be determined as the color consistency area. For example, color differences of pixels in the empty window area are within the threshold range. The performing color identification on the first image, to obtain an empty window area of the first image includes: performing color identification on the first image, to obtain a color consistency area on the first image. Referring to FIG. 2-2, in FIG. 2-2, the first image A is analyzed, to obtain a color consistency area 81; the first image B is analyzed, to obtain color consistency areas 82 and 83; and then, an area including words is removed from the color consistency area, to obtain an empty window area. Step S204 further includes: determining whether the empty window area is larger than a preset pixel area. In some embodiments, step S204 includes determining whether a number of the pixels in the empty window area is larger than a preset threshold. For example, generally, a two-dimensional barcode area has at least 100 pixels×100 pixels. If the two-dimensional barcode area is excessively small, it is difficult for the advertisement audience to scan the two-dimensional barcode area. For example, although the area 82 is a color consistency area, because the area 82 does not satisfy a threshold that is set for the pixel area, the area 82 cannot be used as an empty window area. If it is satisfied that the empty window area is larger than the preset pixel area, the empty window area is determined as the image area. In addition, when an empty window area is selected, whether a color of a color difference (a color difference?) between a color consistency area and the two-dimensional barcode falls within a preset color threshold range further needs to be considered, and if yes, the color consistency area is omitted, and if not, the consistency area may be used as an empty window area.

In another embodiment of the present disclosure, each time an advertisement is played back, a URL representing a cross-screen conversion operation of the user needs to be constructed, and then, a two-dimensional barcode is generated according to the URL. The URL carries both landing page information (that is, a subject_id, a subject ID or a subject ID parameter) and playback scenario information (that is, a placement_id or a placement ID parameter, an advertisement position ID) for advertisement playback. In addition, when the user scans to access the URL on a mobile end, Cookie information of activities of the user in a domain name *.xx.com is returned. In this way, each cross-terminal operation of the user, a landing page, a playback scenario, and user information are all recorded for a subsequent analysis. Therefore, the method provided in this embodiment of the present disclosure further includes: in step S211, the intelligent creative platform obtains landing page information and playback scenario information for playback of the multimedia information. In step S212, the intelligent creative platform generates the website information according to the landing page information and the playback scenario information.

Herein, the landing page information refers to the first page on a website of the advertiser that is linked to after a visitor views, in another place, a particular marketing activity that is published by the advertiser and that has a specific theme, that is, tempting preferential information or the like (an advertisement image in this embodiment) that is published by using an Email, social media, or an advertisement, and clicks the tempting preferential information. Generally, hidden purposes of various pieces of tempting preferential information on a landing page are to explore and acquire a list of potential customer information, to convert a visitor to a potential customer, and follow up according to the acquired information. The landing page provides very goal-oriented access experience for the visitor. A specific page is displayed, to specify a clear path for the visitor, to continue to deepen a relationship with the website of the advertiser.

In another embodiment of the present disclosure, the method further includes:

In step S221, the intelligent creative platform receives a second request sent by the multimedia demand side, where the second request is used to push (or deliver) the multimedia information.

In step S222, in response to the second request, the intelligent creative platform adds the first image and a first push rule (or a first delivery rule) corresponding to the first image to a first push request (or a first delivery request), and sends the first push request to a multimedia push platform (or a multimedia delivery platform), where the first push rule includes at least: a push object (or a delivery object) is a mobile terminal (or the user device). In some embodiments, the multimedia delivery platform delivers the multimedia information. In some embodiments, the first delivery rule indicates that the first image is to be delivered to the user device.

In step S223, in response to the second request, the intelligent creative platform adds the second image and a second push rule (or a second delivery rule) corresponding to the second image to a second push request (or a second delivery request), and sends the second push request to the multimedia push platform, where the second push rule is: a push object is a non-mobile terminal (or a display device). In some embodiments, the second delivery rule indicates that the second image is to be delivered to the display device.

In step S224, the intelligent creative platform receives an access request sent by a multimedia audience (or the user), where the access request carries the website information corresponding to the image identification code. In step S225, the intelligent creative platform obtains to-be-displayed information according to the website information, adds the to-be-displayed information to a pre-access response, and sends the access response to the multimedia audience.

In this embodiment, the second image with the two-dimensional barcode is pushed on a non-mobile terminal side, for example, pushed to a television, an advertisement wall (electronic or non-electronic), or a PC. Because the advertisement provided in this embodiment of the present disclosure includes the two-dimensional barcode, the user uses a mobile phone to scan the two-dimensional barcode in the advertisement located on the PC side, to further identify a website corresponding to the two-dimensional barcode; and then, the user further accesses the website, to obtain more advertisement information.

During network advertising marketing of the advertiser, a "creative" has very outstanding value, and is also an incredibly challenging part. When a "creative" generation process is studied carefully, it may be found that many regular activities are included. In addition, multiple pieces of data and multiple algorithm modules may be interleaved, to implement coordination, and a machine is used to intelligently optimize displayed content of a creative, to generate a more beautiful creative work with a better conversion effect. In the old days, if a customer wants to buy something, the customer often goes to a shop to buy on site. With the era of Internet, the customer sits at a computer to place an order by clicking a mouse. Nowadays, the customer carries with a smartphone, and can decide to go shopping at any time and any place. By means of an intelligent creative technology, digitization and automation of a creative are both supported; and a terminal playback scenario closely combined with an advertising creative provides a timelier scenario and more smooth marketing experience for the advertisement audience.

From the perspective of overall network advertisement traffic distribution, traffic on a mobile side is scarce in respect to traffic on a PC side. For the advertising system, how to maximize value of traffic on the mobile side and implement a seamless handover between a PC terminal and a mobile terminal is very important. In this embodiment of the present disclosure, a creative displayed on a PC end is edited again, a two-dimensional barcode that can be identified by the mobile terminal is displayed on the PC end, and after the user uses the mobile terminal to scan the two-dimensional barcode, a landing page for advertising marketing is directly opened, thereby implementing a seamless handover between marketing scenarios on the PC end and the mobile end. In short, in this embodiment, the creative on the PC end is edited again and optimized, to guide advertisement traffic from the PC end to the mobile end.

For advertisers, in the era of mobile Internet, a growing quantity of Internet marketing products exist in a product ecology built on a mobile end, and a growing quantity of advertisers expect to reach user groups of mobile terminals. Referring to an image A in FIG. 3-1, at the original PC era, there are a very small quantity of audiences of Internet marketing products; with the era of mobile Internet, referring to an image B in FIG. 3-1, Internet marketing products can reach PC users, and can further reach users of mobile terminals such as mobile phones. Therefore, in FIG. 3-1, compared with the image A, in the image B, more user groups exist.

In combination of a conversion capability of an intelligent creative platform, a two-dimensional barcode is added on such a basis. The two-dimensional barcode is intelligently spliced into an advertising creative display area, to intelligently identify an empty window area, so as to enable a cross-terminal conversion capability. FIG. 3-2 is a schematic implementation flowchart of a multimedia information processing method according to an embodiment of the present disclosure. As shown in FIG. 3-2, the method includes the following steps:

In step S321, an advertiser requests creative making.

Herein, the advertiser sends a creative making request to an intelligent creative platform.

In step S322, an intelligent creative platform requests creative making from a creative supplier.

Herein, the intelligent creative platform receives the creative making request sent by the advertiser, and then, the intelligent creative platform sends the creative making request to the creative supplier.

In step S323, the creative supplier returns an advertising creative to the intelligent creative platform.

In step S324, the intelligent creative platform performs creative pre-registration.

In step S325, the intelligent creative platform returns the advertising creative to the advertiser.

Herein, the intelligent creative platform returns at least one advertising creative to the advertiser, and then, after receiving the advertising creative returned by the intelligent creative platform, the advertiser selects one advertising creative from multiple advertising creatives. It may be learned from the foregoing steps in FIG. 3-2, currently, the intelligent creative platform mainly acquires a creative demand from the advertiser and distributes the creative demand to the creative supplier. After the creative supplier generates a creative and is subject to a series of mechanisms such as contention, the creative supplier returns the creative to the advertiser.

In step S326, the advertiser enables a cross-terminal conversion function.

Herein, during implementation, the cross-terminal conversion function is a representation form of a technical solution provided in this embodiment of the present disclosure in terms of a product. That is, the advertiser may select the function, and then, the advertiser adds a website. A terminal corresponding to an advertiser side adds the website to a cross-terminal conversion request (that is, a first request), and sends the cross-terminal conversion request to the intelligent creative platform.

In step S327, the intelligent creative platform identifies a two-dimensional barcode area.

Herein, the intelligent creative platform generates a two-dimensional barcode according to the website in the cross-terminal conversion request, and then, adds the two-dimensional barcode to the advertising creative, and returns the advertising creative to the advertiser. Note that, the cross-terminal conversion request may further include ID information of the advertising creative, and then, the intelligent creative platform adds the two-dimensional barcode to the advertising creative according to the ID information of the advertising creative.

In step S328, the intelligent creative platform returns the advertising creative with the two-dimensional barcode area to the advertiser.

In step S329, the advertiser pushes an advertisement on an advertising system.

In step S330, in some embodiments, an audience requests the advertisement from the intelligent creative platform. In some embodiments, the audience requests the advertisement from the advertising system.

In step S331, in some embodiments, the intelligent creative platform returns, to the audience, the advertisement including the two-dimensional barcode. In some embodiments, the advertising system returns, to the audience, the advertisement including the two-dimensional barcode.

Herein, once the advertiser successfully pushes the advertisement, the advertisement audience views the advertisement. Note that, generally, the advertisement including the two-dimensional barcode is pushed on a non-mobile terminal side, for example, pushed to a television, an advertisement wall (electronic or non-electronic), or a PC. Referring to FIG. 3-3, because the advertisement provided in this embodiment of the present disclosure includes the two-dimensional barcode, the user uses a mobile terminal such as a mobile phone 31 to scan a two-dimensional barcode 33 in an advertisement located on a PC side 32, to further identify a website corresponding to the two-dimensional barcode; and then, the user further accesses the website, to obtain more advertisement information.

If the two-dimensional barcode is successfully scanned, the mobile terminal of the audience sends an access request to the advertising system or the intelligent creative platform. The access request carries the website information obtained through an analysis, and then, the advertising system or the intelligent creative platform returns, to the mobile terminal of the audience according to the website information, advertisement information corresponding to the two-dimensional barcode.

In the foregoing embodiment, the advertiser (that is, a creative demand side) first requests creative making by using the intelligent creative platform. After performing a series of programmed operations, the creative supplier returns a completed creative to the intelligent creative platform, and the intelligent creative platform performs pre-registration and then, returns the creative to the creative demand side for preview by the creative demand side. When the creative demand side expects to enable the cross-terminal conversion capability and function, the intelligent creative platform finds, by using an image analysis capability, an area that is most appropriate for placing the two-dimensional barcode, and returns, to the creative demand side, image data including the two-dimensional barcode area. The area information is used as an image URL parameter for reservation, and is used in subsequent advertisement push and playback. An example of an image URL is as follows:

http://pgdt.gtimg.cn/gdt/0/
DCdo7JdAFUAFUACZBXfcrfCX-lHmz0.png/0?ck=. . . &qr_rect=0%2c0%2c120%2c120 . . . .

In the foregoing embodiment, for an image content delivery network (CDN) address used to play back the advertisement, descriptions of the two-dimensional barcode area are added, for example, a square area whose size is 120 pixels on the upper left corner of an image.

Figures 1, 3:
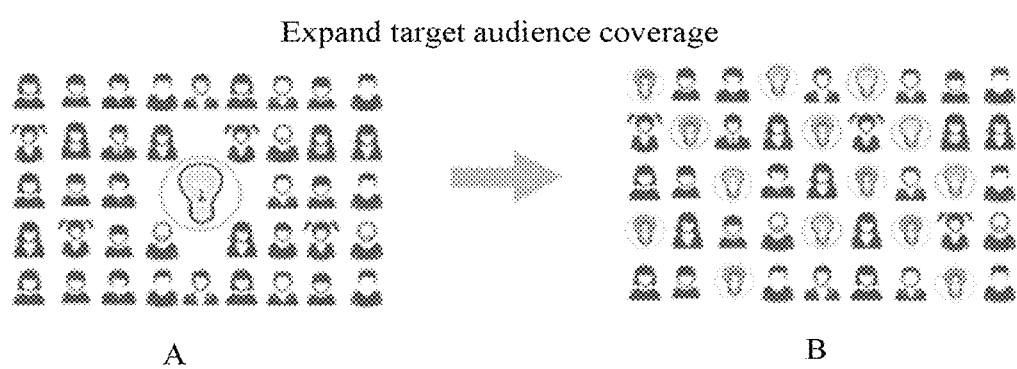
Figures 2, 3:
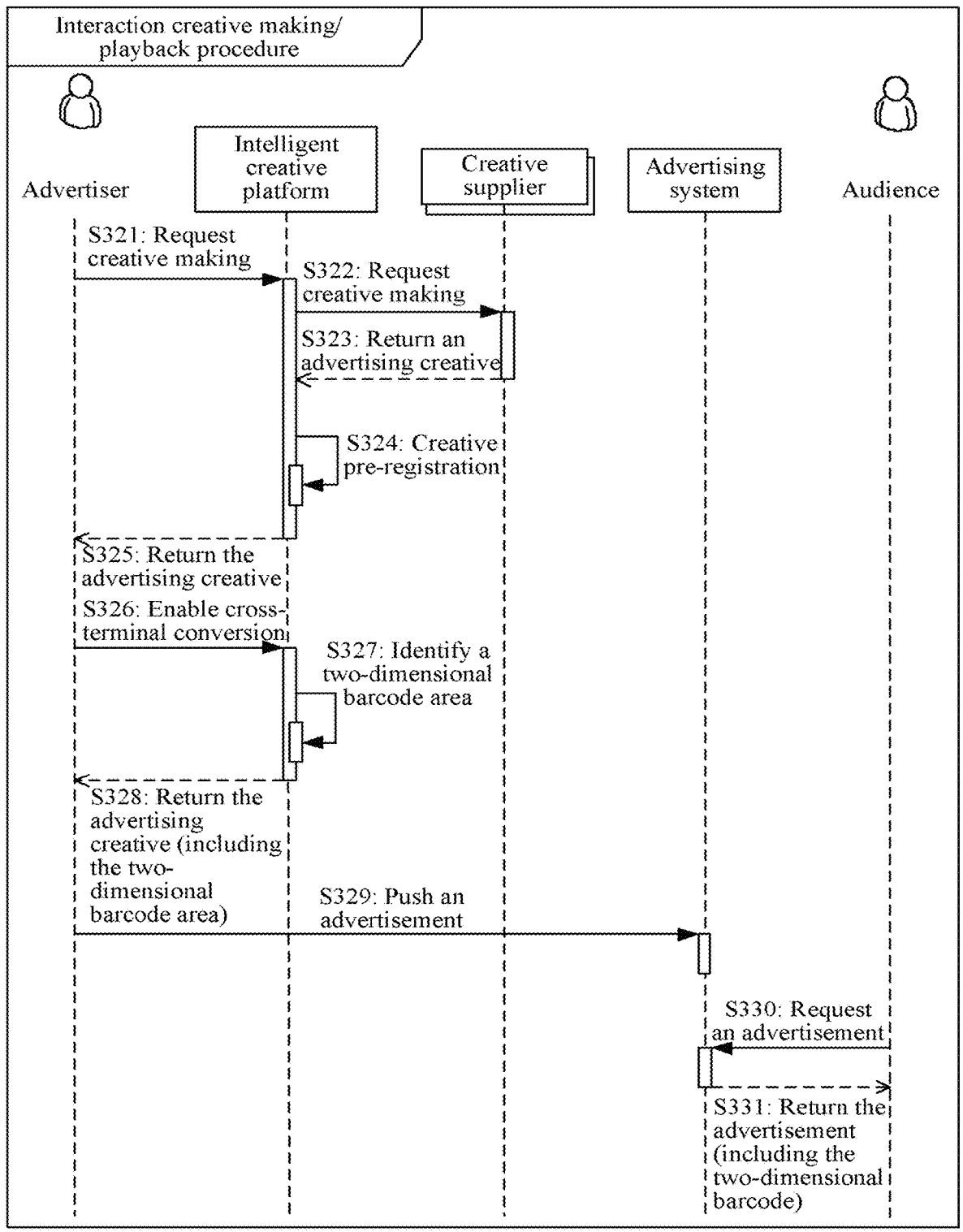
Figure 3:
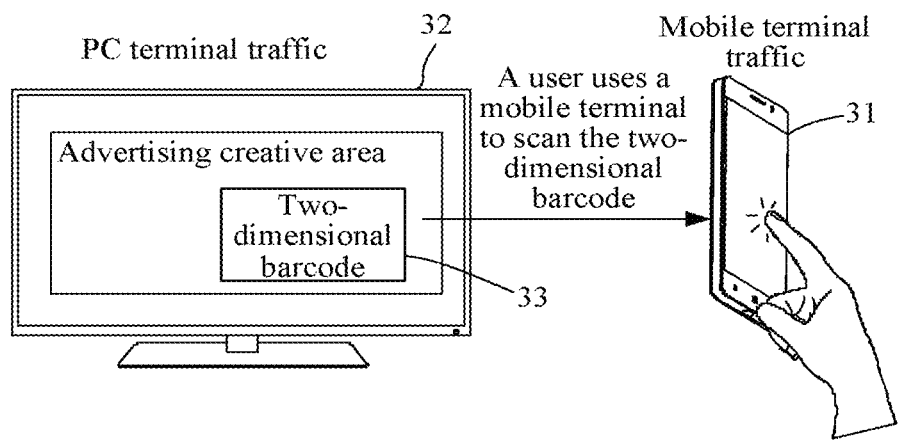
Figures 3, 4:
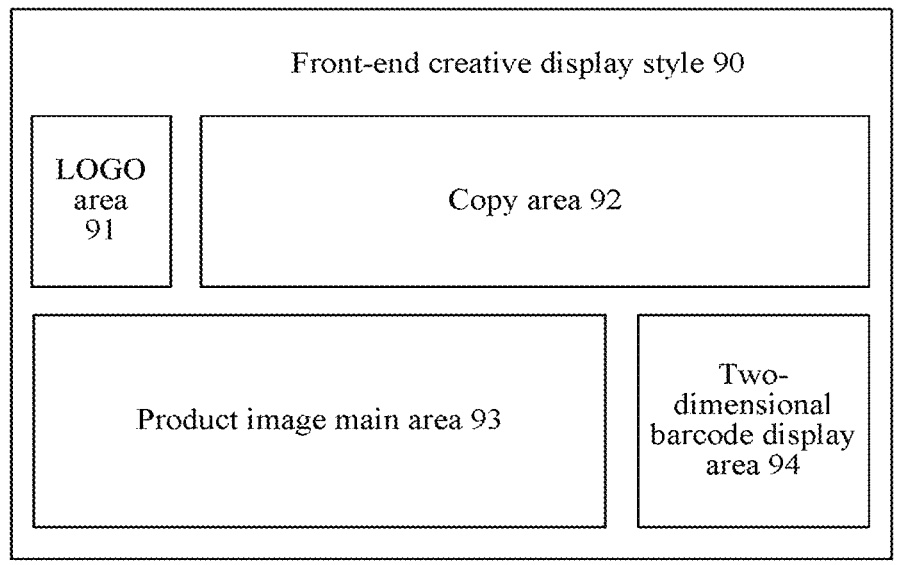
Figures 3, 4, 5:
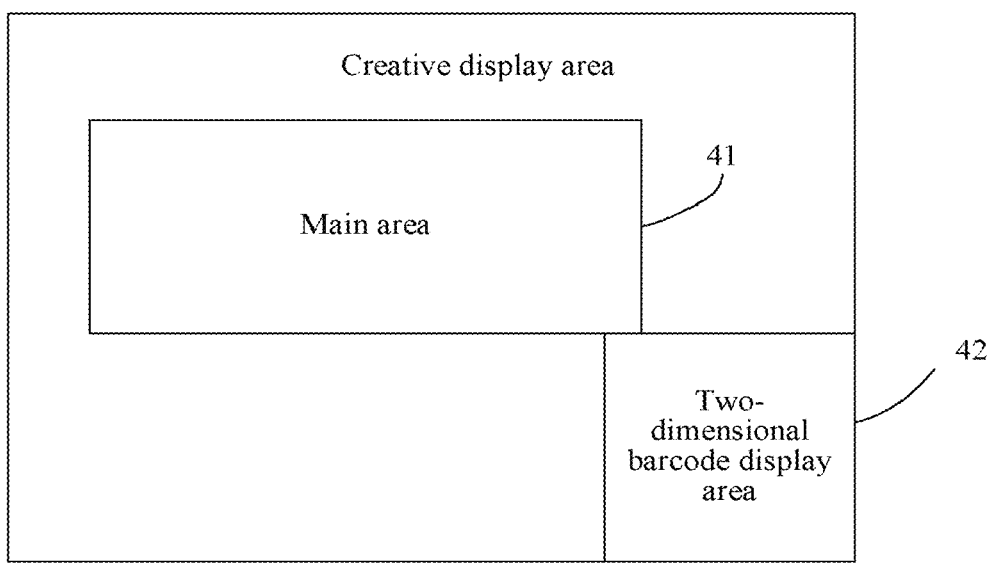
Figures 3, 4, 5, 6:
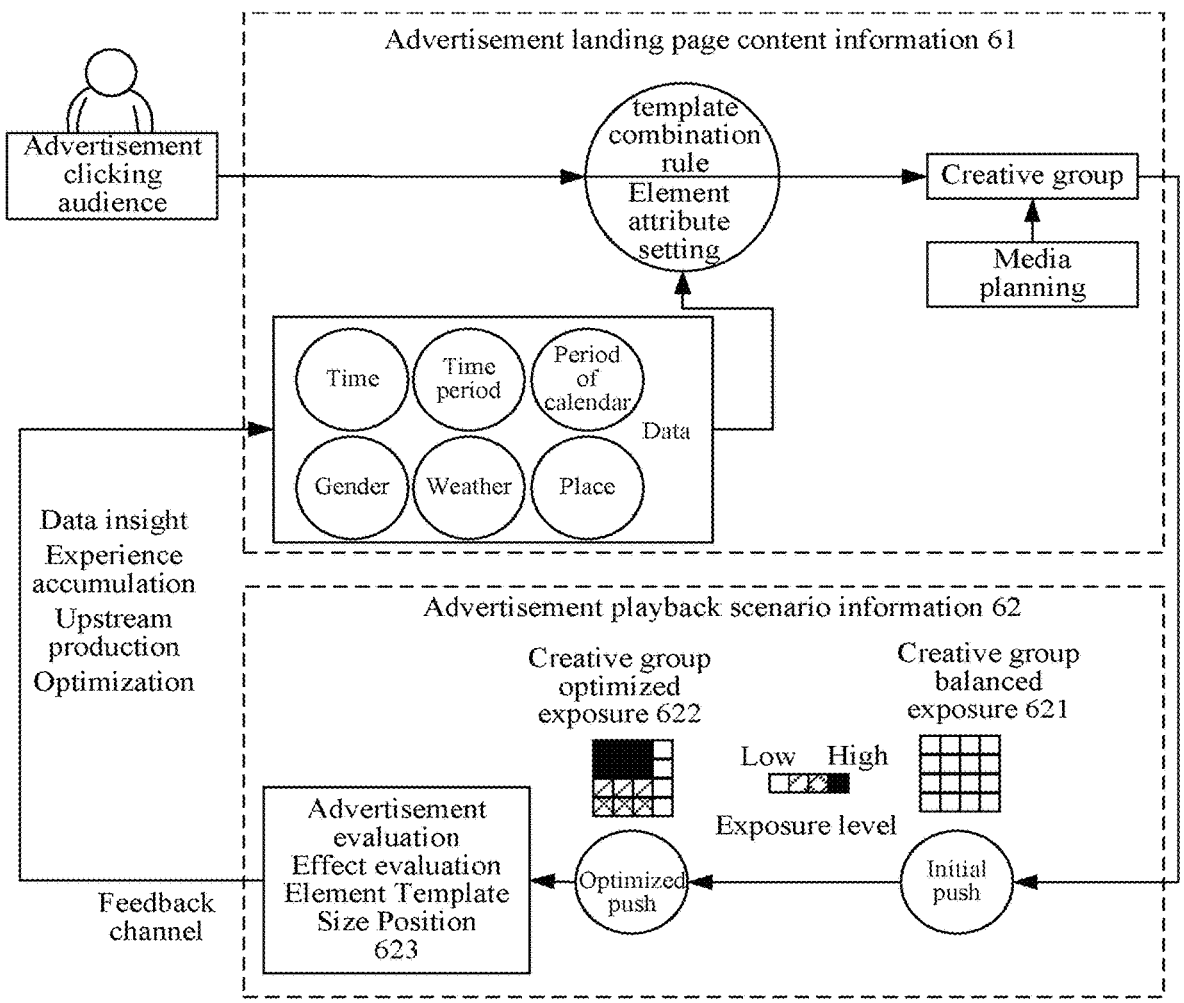
Figures 3, 4, 5, 6, 7:
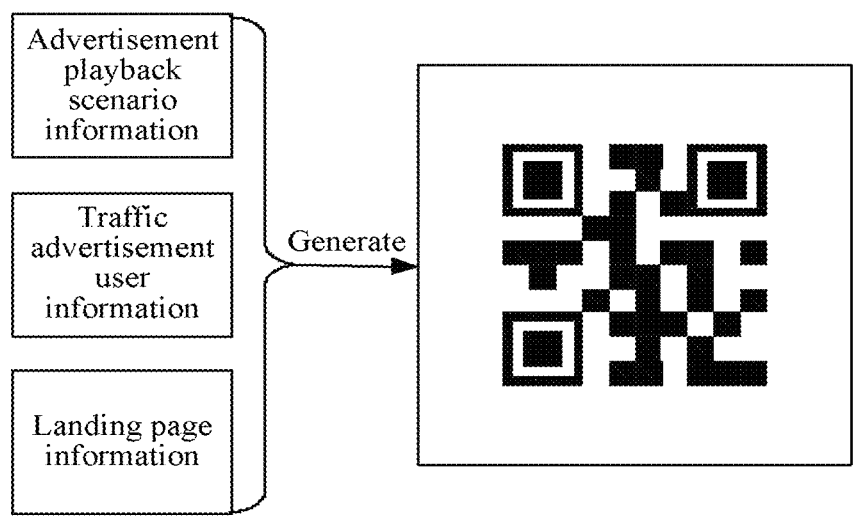
Figure 4:
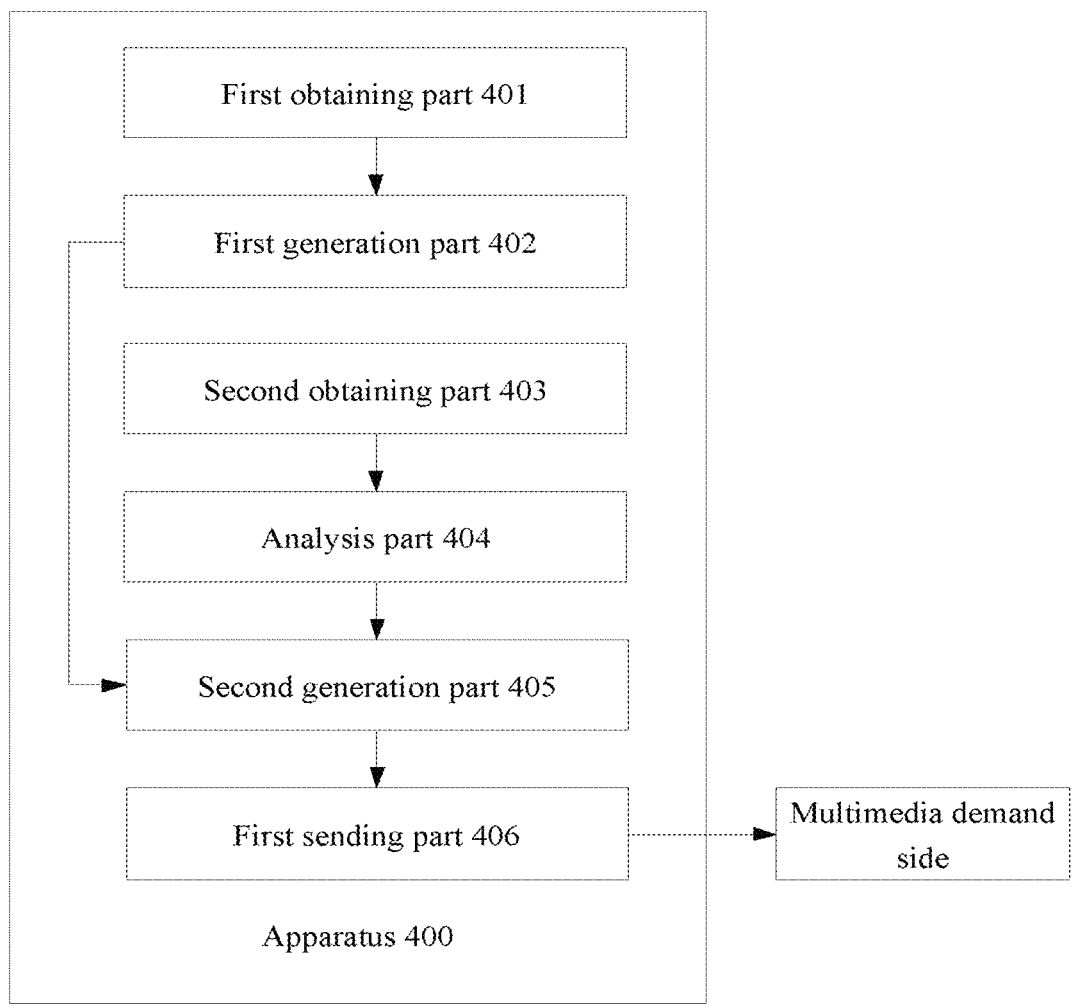
Figure 5:
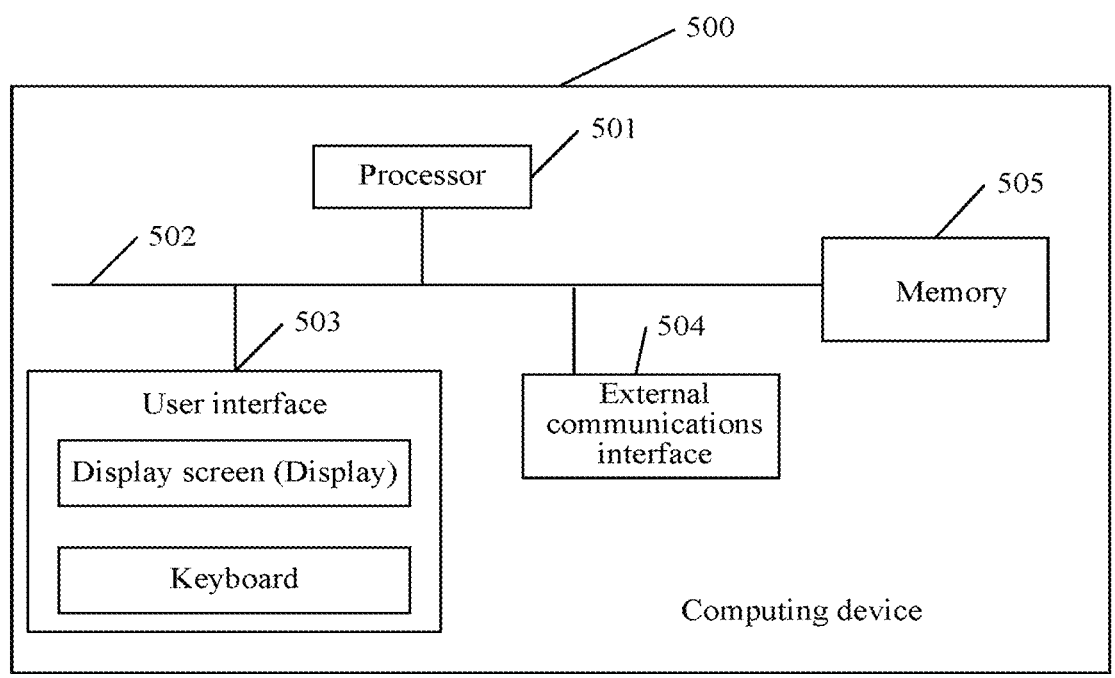

It may be learned from the foregoing embodiment that, the intelligent creative platform provided in this embodiment of the present disclosure has the following features:

(1) The intelligent creative platform intelligently identifies an "empty window area" of the advertising creative, and displays two-dimensional barcode information in the area in a splicing manner. To ensure high-quality creative optimization effect, prevent splicing of a generated two-dimensional barcode into a creative from affecting display and a good appearance of main elements of the original creative, and provide a technology for splicing the two-dimensional barcode as quick as possible while ensuring high identification accuracy of the creative display area, the two-dimensional barcode is spliced into and displayed on a front-end creative display style. Referring to FIG. 3-4, a front-end creative display style 90 includes a logo area 91, a copy area 92 used to describe a product, a product image main area 93 used to display the product, and a two-dimensional barcode display area 94. The two-dimensional barcode display area 94 is located on the lower right corner and is rectangular, and generally is square. In this embodiment of the present disclosure, as shown in FIG. 3-5, a technology for intelligently identifying an "empty window area" in an image uses a set of mature image analysis frameworks. The framework can provide a main area 41 of a creative image in a form of a rectangular area. After the main area is obtained, a display area 42 appropriate for placing the two-dimensional barcode is in an area in a hollow square style obtained after the main area is removed from an area of the original image. Next, a largest square area meeting a display requirement is found from four corners of the creative display area, to display the two-dimensional barcode.

(2) The two-dimensional barcode information carries an advertisement playback scenario, user information, and landing page content information. For example, landing page information of a pushed advertisement, clicking user information, and advertisement playback terminal scenario information are integrated and connected in series, to implement a closed loop of a creative, media, and a user. FIG. 3-6 is a schematic implementation flowchart of a closed loop of a creative, media, and a user according to an embodiment of the present disclosure. Referring to FIG. 3-6, advertisement landing page information 61 includes an advertisement template combination rule, an element attribute setting, and a creative group. Advertisement clicking audience information and data fed back by using advertisement playback scenario information both act on the advertisement template combination rule and the element attribute setting. In advertisement playback scenario information 62, during initial push, creative group exposure data 621 is obtained, and then, optimized exposure is performed to obtain creative group optimized exposure data 622. Finally, data 623 of advertisement evaluation, effect evaluation, an element, a template, a size, and a position is obtained, and then, the data is used to form feedback data to the advertisement landing page information 61. It may be learned that, the closed loop of a creative, media, and a user can be personalized and targeted for different users on an advertisement audience side. By means of digital and programmed processing, attribute and label information of an advertisement audience on a PC end are extracted in real time, an advertisement playback media scenario is scanned and identified, and a two-dimensional barcode is generated in combination with personalized information on a landing page. When the two-dimensional barcode is spliced into a creative, during generation of a new creative, an advertisement playback scenario, user information, and landing page content information are naturally carried. It is convenient for performing matching between a creative element and landing page information in a one-to-one manner. When the user uses a mobile terminal to scan the two-dimensional barcode to open a precise landing page, accuracy of traffic is greatly improved, thereby implementing precise traffic guide.

In the foregoing embodiment, a technology for displaying the two-dimensional barcode to the audience during playback of the advertisement include the following two steps:

(1) Construct a URL of a Cross-Terminal Conversion Operation.

Each time an advertisement is played back, a URL representing a cross-screen conversion operation of a user needs to be constructed, and a format of the URL may be: https://a.gdt.gq.com/qr?s={subject_id}&p={placement_id}. Next, a two-dimensional barcode is generated according to the URL. Referring to FIG. 3-7, a two-dimensional barcode is generated according to advertisement playback scenario information, traffic advertisement user information, and landing page information. For example, the URL carries both landing page information (that is, a subject_id, a subject ID) and playback scenario information (that is, a placement_id, an advertisement position ID) for advertisement playback. In addition, when the user scans to access the URL on a mobile end, Cookie information of activities of the user in a domain name *.qq.com is fed back. In this way, each cross-terminal operation of the user, a landing page, a playback scenario, and user information are all recorded for a subsequent analysis.

(2) A target URL is converted into a two-dimensional barcode, and is displayed in an "empty window area" of an image. With continuous improvement of browser kernel technologies, the Hyper Text Markup Language (HTML) H5 has been gradually popularized. In this embodiment, during advertisement playback, real-time drawing of the two-dimensional barcode uses an H5 Canvas (canvas, an H5 label) technology, and the URL of the cross-terminal conversion operation is dynamically represented as a square two-dimensional barcode image whose size is M (M≥100) pixels. With reference to an actual position of the empty window area of the image, the two-dimensional barcode is covered on the original image by using JavaScript.

It may be learned from the foregoing embodiment that, the intelligent creative platform provided in this embodiment of the present disclosure intelligently identifies the "empty window area" of the advertising creative, and displays the two-dimensional barcode information in the area in a splicing manner. In combination of the conversion capability of the intelligent creative platform, the two-dimensional barcode is added on such a basis, so as to enable the cross-terminal conversion capability.

This embodiment of the present disclosure provides an advertising creative conversion and display manner, that is, a new cross-terminal advertising form for an advertiser and an advertisement audience: A two-dimensional barcode is generated based on advertisement landing page information and advertisement audience information, and is intelligently spliced into an advertising creative display area, to intelligently identify an empty window area; and the two-dimensional barcode is displayed on an advertising creative, so that the advertisement audience can scan the two-dimensional barcode, to implement interaction in cross-terminal advertisement information tracking. Such a cross-terminal direct information transmission manner can also reduce a customer churn in cross-terminal advertising interaction, and finally improve effect conversion data such as an advertisement effect CVR and a ROI. In addition, traffic resources of multiple terminals are fully used, to maximize value of the traffic, thereby improving overall incomes of an advertising system.

Based on the foregoing embodiment, an embodiment of the present disclosure further provides a multimedia information processing apparatus. Various parts included in the apparatus and various sub parts included in the parts may all be implemented by using the intelligent creative platform in the foregoing embodiment, and certainly, may also be implemented by using a logical circuit. During implementation, a processor may be a central processing unit (CPU), a microprocessor (MPU), a digital signal processor (DSP), a field programmable gate array (FPGA), or the like. Note that, during implementation, the intelligent creative platform may be implemented by using a computing device. During implementation, the computing device may be various types of electronic devices having an information processing capability, for example, the electronic device may include a mobile phone, a tablet computer, a desktop computer, a personal digital assistant, or a server cluster.

FIG. 4 is a schematic structural diagram of a multimedia information processing apparatus according to an embodiment of the present disclosure. As shown in FIG. 4, the apparatus 400 includes a first obtaining part 401, a first generation part 402, a second obtaining part 403, an analysis part 404, a second generation part 405, and a first sending part 406.

The first obtaining part 401 is configured to obtain attribute information of multimedia information, the attribute information of the multimedia information including at least website information used to display the multimedia information, and ID information of the multimedia information.

The first generation part 402 is configured to generate an image identification code according to at least the website information in the attribute information.

The second obtaining part 403 is configured to obtain, according to the ID information of the multimedia information, a first image corresponding to the multimedia information.

The analysis part 404 is configured to analyze the first image, to obtain an image area used to display the image identification code.

The second generation part 405 is configured to add the image identification code to the image area of the first image, to generate a second image.

The first sending part 406 is configured to send the second image to a multimedia demand side.

In another embodiment of the present disclosure, the apparatus further includes a first receiving part, configured to receive a first request sent by the multimedia demand side, where the first request carries the attribute information of the multimedia information, and the first request is used to request an image including the image identification code;

the first obtaining part is configured to: in response to the first request, obtain the attribute information of the multimedia information; and the first sending part is configured to: add the second image to a first response, and send the first response to the multimedia demand side.

In another embodiment of the present disclosure, the analysis part includes an identification sub part and a determining sub part.

The identification sub part is configured to perform color identification on the first image, to obtain an empty window area of the first image.

The determining sub part is configured to determine the empty window area as the image area.

In another embodiment of the present disclosure, the apparatus further includes a third obtaining part and a third generation part.

The third obtaining part is configured to obtain landing page information and playback scenario information for playback of the multimedia information.

The third generation part is configured to generate the website information according to the landing page information and the playback scenario information.

In another embodiment of the present disclosure, the apparatus further includes a second receiving part, a second sending part, and a third sending part.

The second receiving part is configured to receive a second request sent by the multimedia demand side, where the second request is used to push the multimedia information.

The second sending part is configured to: in response to the second request, add the first image and a first push rule corresponding to the first image to a first push request, and send the first push request to a multimedia push platform, where the first push rule includes at least: a push object is a mobile terminal.

The third sending part is configured to: in response to the second request, add the second image and a second push object corresponding to the second image to a second push request, and send the second push request to the multimedia push platform, where the second push rule is: a push object is a non-mobile terminal.

In another embodiment of the present disclosure, the apparatus further includes a third receiving part, a processing part, and a third sending part.

The third receiving part is configured to receive an access request sent by a multimedia audience, where the access request carries the website information corresponding to the image identification code.

The processing part is configured to obtain to-be-displayed information according to the website information, and add the to-be-displayed information to a pre-access response.

The third sending part is configured to send the access response to the multimedia audience.

The foregoing descriptions of the apparatus embodiment are similar to the foregoing descriptions of the method embodiment, and the apparatus embodiment have beneficial effects similar to those of the method embodiment, and therefore are not described in detail. For undisclosed technical details of the apparatus embodiment in the present disclosure, refer to the descriptions of the method embodiment in the present disclosure for understanding.

Based on the foregoing embodiment, an embodiment of the present disclosure provides a computing device. FIG. 5 is a schematic structural diagram of a computing device according to an embodiment of the present disclosure. As shown in FIG. 5, the computing device 500 may include at least one processor 501, at least one communications bus 502, a user interface 503, at least one external communications interface 504, and a memory 505. The communications bus 502 is configured to implement a connection and communication between these components. The user interface 503 may include a display screen and a keyboard. Optionally, the external communications interface 504 may include a standard wired interface and a standard wireless interface. The processor 501 is configured to:

obtain attribute information of multimedia information, the attribute information of the multimedia information including at least website information used to display the multimedia information, and ID information of the multimedia information;

generate an image identification code according to at least the website information in the attribute information;

obtain, according to the ID information of the multimedia information, a first image corresponding to the multimedia information;

analyze the first image, to obtain an image area used to display the image identification code;

add the image identification code to the image area of the first image, to generate a second image; and send the second image to a multimedia demand side by using the external communications interface.

In another embodiment of the present disclosure, the processor is further configured to: receive, by using the external communications interface, a first request sent by the multimedia demand side, where the first request carries the attribute information of the multimedia information, and the first request is used to request an image including the image identification code;

in response to the first request, obtain the attribute information of the multimedia information; and add the second image to a first response, and send the first response to the multimedia demand side by using the external communications interface.

In another embodiment of the present disclosure, the analyzing the first image, to obtain an image area used to display the image identification code includes: performing color identification on the first image, to obtain an empty window area of the first image; and determining the empty window area as the image area.

In another embodiment of the present disclosure, the processor is further configured to: obtain landing page information and playback scenario information for playback of the multimedia information; and generate the website information according to the landing page information and the playback scenario information.

In another embodiment of the present disclosure, the processor is further configured to: receive, by using the external communications interface, a second request sent by the multimedia demand side, where the second request is used to push the multimedia information; in response to the second request, add, by using the external communications interface, the first image and a first push rule corresponding to the first image to a first push request, and send the first push request to a multimedia push platform by using the external communications interface, where the first push rule includes at least: a push object is a mobile terminal; and in response to the second request, add the second image and a second push object corresponding to the second image to a second push request, and send the second push request to the multimedia push platform by using the external communications interface, where the second push rule is: a push object is a non-mobile terminal.

In another embodiment of the present disclosure, the processor is further configured to: receive, by using the external communications interface, an access request sent by a multimedia audience, where the access request carries the website information corresponding to the image identification code; and obtain to-be-displayed information according to the website information, add the to-be-displayed information to a pre-access response, and send the access response to the multimedia audience by using the external communications interface.

Note that, the foregoing descriptions of the computing device embodiment are similar to the foregoing descriptions of the method, and the computing device embodiment have beneficial effects the same as those of the method embodiment, and therefore are not described in detail. For undisclosed technical details of the computing device embodiment in the present disclosure, a person skilled in the art refers to the descriptions of the method embodiment in the present disclosure for understanding. For brevity, details are not described herein again.

In the embodiments of the present disclosure, if the foregoing multimedia information processing method is implemented in a form of software functional modules and sold or used as independent products, the method may be stored in a computer readable storage medium. Based on such an understanding, the technical solutions of the embodiments of the present disclosure essentially, or the part contributing to the related technology may be implemented in a form of a software product. The computer software product is stored in a storage medium, and includes several instructions for instructing a computer device (which may be a PC, a server, or a network device) to perform all or some of the methods described in the embodiments of the present disclosure. The foregoing storage medium includes any medium that can store program code, such as a USB flash drive, a removable hard disk, a read-only memory (ROM), a magnetic disk, or an optical disc. In this way, the embodiments of the present disclosure are not limited to any particular combination of hardware and software.

An embodiment of the present disclosure provides a computer storage medium. Computer executable instructions are stored in the computer storage medium, and the computer executable instructions are used to perform the multimedia information processing method provided in the embodiments of the present disclosure.

An embodiment of the present disclosure provides a multimedia information processing device, including:

a storage medium, configured to store executable instructions; and a processor, configured to execute the stored executable instructions, the executable instructions being used to perform the foregoing multimedia information processing method.

It should be understood that, "one embodiment" or "an embodiment" mentioned throughout the specification indicates that a particular feature, structure, or property that is related to the embodiments is included in at least one embodiment of the present disclosure. Therefore, "in one embodiment" or "in an embodiment" that appears throughput the entire specification does not necessarily mean a same embodiment. In addition, these particular features, structures, or properties may be combined in one or more embodiments in any proper manner. It should be understood that sequence numbers of the foregoing processes do not mean execution sequences in various embodiments of the present disclosure. The execution sequences of the processes can be determined according to functions and internal logic of the processes, and should not be construed as any limit to the implementation processes of the embodiments of the present disclosure. The sequence numbers of the foregoing embodiments of the present disclosure are merely for description but do not indicate the preference of the embodiments.

Note that, in this specification, the terms "include", "comprise", and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or includes inherent elements of the process, method, object, or apparatus. Unless otherwise specified, an element limited by the sentence "include a/an . . . " does not exclude other same elements existing in the process, method, object, or apparatus that includes the element.

In the several embodiments provided in this application, it should be understood that the disclosed device and method may be implemented in other manners. The described device embodiments are merely exemplary. For example, the part division is merely logical function division and may be other division during actual implementation. For example, multiple parts or components may be combined or integrated into another system, or some features may be ignored or not performed. In addition, the displayed or discussed mutual couplings or direct couplings or communication connections between constituent parts may be implemented through some interfaces. The indirect couplings or communication connections between the devices or parts may be implemented in electronic, mechanic, or other forms.

The parts described as separate parts may or may not be physically separate, and components displayed as parts may or may not be physical parts, may be located in one position, or may be distributed on multiple network parts. Some or all of the parts may be selected according to actual needs to achieve the objectives of the solutions of the embodiments.

In addition, functional parts in the embodiments of the present disclosure may be all integrated in a processing part, each part is separately used as a part, or two or more parts are integrated in a part. The integrated part may be implemented in a form of hardware, or may be implemented in form of hardware in addition to a software functional part.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a mobile storage device, a ROM, a magnetic disk, or an optical disc.

Alternatively, when the integrated part in the present disclosure is implemented in the form of a software functional module and sold or used as an independent product, the integrated part may be stored in a computer readable storage medium. Based on such an understanding, the technical solutions of the embodiments of the present disclosure essentially, or the part contributing to the related technology may be implemented in a form of a software product. The computer software product is stored in a storage medium, and includes several instructions for instructing a computer device (which may be a PC, a server, or a network device) to perform all or some of the methods described in the embodiments of the present disclosure. The foregoing storage medium includes any medium that can store program code, such as a mobile storage device, a ROM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

INDUSTRIAL APPLICABILITY

In the embodiments of the present disclosure, attribute information of multimedia information is obtained, the attribute information of the multimedia information including at least website information used to display the multimedia information, and ID information of the multimedia information; an image identification code is generated according to at least the website information in the attribute information; a first image corresponding to the multimedia information is obtained according to the ID information of the multimedia information; the first image is analyzed, to obtain an image area used to display the image identification code; the image identification code is added to the image area of the first image, to generate a second image; and the second image is sent to a multimedia demand side. In this way, landing page content information is provided to a user in a cross-terminal multimedia form, so as to maximize value of mobile traffic.

What is claimed is:

1. A method for processing multimedia information, comprising:
    obtaining, by processing circuitry of an apparatus, attribute information of the multimedia information that is associated with a multimedia provider, the attribute information including website information of a website used to display the multimedia information and identifier (ID) information associated with the multimedia information;
    generating, by the processing circuitry, a machine-readable identification code to be scanned by a user device of a user based on at least the website information;
    obtaining a first image corresponding to the multimedia information based on the ID information;
    determining, by the processing circuitry, an image area in the first image in which the machine-readable identification code is to be inserted;
    inserting, by the processing circuitry, the machine-readable identification code into the image area of the first image to generate a second image that includes the machine-readable identification code;
    generating a first delivery request that includes the first image and a corresponding first delivery rule and sending the first delivery request to a multimedia delivery platform that delivers the multimedia information, the first delivery rule indicating that the first image is to be delivered to the user device which is a mobile device; and
    generating a second delivery request that includes the second image and a corresponding second delivery rule and sending the second delivery request to the multimedia delivery platform, the second delivery rule indicating that the second image is to be delivered to a non-mobile display device.

2. The method according to claim 1, further comprising:
    receiving, by interface circuitry, a request for the second image from the multimedia provider, the request for the second image including the attribute information; and
    the obtaining includes obtaining the attribute information from the request for the second image.

3. The method according to claim 2, further comprising:
    generating a response to the request for the second image, the response including the second image; and
    sending the response to the multimedia provider.

4. The method according to claim 2, further comprising:
    obtaining landing page information of the website and playback scenario information for playback of the multimedia information; and
    generating the website information based on the landing page information and the playback scenario information.

5. The method according to claim 1, wherein the determining the image area in the first image comprises:
    performing color identification on the first image;
    obtaining an empty window area in the first image based on the color identification, the empty window area not including characters and color differences of pixels in the empty window area being within a threshold range; and
    selecting the empty window area to be the image area in the first image.

6. The method according to claim 5, wherein a number of the pixels in the empty window area is larger than a preset threshold.

7. The method according to claim 1, further comprising:
    receiving an access request from the user, the access request including the web site information corresponding to the machine-readable identification code;
    obtaining information to be displayed from the website based on the website information, the information to be displayed being related to the multimedia information; and
    sending the information to be displayed to the user.

8. The method according to claim 1, wherein the machine-readable identification code is a two-dimensional barcode.

9. The method according to claim 8, further comprising:
    generating the two-dimensional barcode based on a Uniform Resource Locator (URL) that includes a subject ID parameter and a placement ID parameter, the subject ID parameter including landing page information of the website and the placement ID parameter including playback scenario information for playback of the multimedia information.

10. The method according to claim 1, wherein the multimedia information is in a form of a video, and the first image is a last frame of image in the video.

11. The method according to claim 10, wherein the second image is configured to be displayed for a predetermined time that is at least one minute.

12. An apparatus for processing multimedia information, comprising:
    processing circuitry configured to:
        obtain attribute information of the multimedia information that is associated with a multimedia provider, the attribute information including website information of a website used to display the multimedia information and identifier (ID) information associated with the multimedia information;
        generate a machine-readable identification code to be scanned by a user device of a user based on at least the website information;
        obtain a first image corresponding to the multimedia information based on the ID information;
        determine an image area in the first image in which the machine-readable identification code is to be inserted; and
        insert the machine-readable identification code into the image area of the first image to generate a second image that includes the machine-readable identification code;
        generate a first delivery request that includes the first image and a corresponding first delivery rule and send the first delivery request to a multimedia delivery platform that delivers the multimedia information, the first delivery rule indicating that the first image is to be delivered to the user device which is a mobile device; and generate a second delivery request that includes the second image and a corresponding second delivery rule and send the second delivery request to the multimedia delivery platform, the second delivery rule indicating that the second image is to be delivered to a non-mobile display device.

13. The apparatus according to claim 12, wherein further comprising:
interface circuitry configured to receive a request for the second image from the multimedia provider, the request for the second image including the attribute information, wherein
the processing circuitry is further configured to obtain the attribute information from the request for the second image.

14. The apparatus according to claim 13, further configured to:
generate a response to the request for the second image, the response including the second image; and
send the response to the multimedia provider.

15. The apparatus according to claim 13, further configured to:
obtain landing page information of the website and playback scenario information for playback of the multimedia information; and
generate the website information based on the landing page information and the playback scenario information.

16. The apparatus according to claim 12, wherein the processing circuitry is further configured to:
perform color identification on the first image;
obtain an empty window area in the first image based on the color identification, the empty window area not including characters and color differences of pixels in the empty window area being within a threshold range; and
select the empty window area to be the image area in the first image.

17. The apparatus according to claim 16, wherein a number of the pixels in the empty window area is larger than a preset threshold.

18. The apparatus according to claim 12, further configured to:
receive an access request from the user, the access request including the website information corresponding to the machine-readable identification code;
obtain information to be displayed from the website based on the web site information, the information to be displayed being related to the multimedia information; and
send the information to be displayed to the user.

19. The apparatus according to claim 12, wherein the machine-readable identification code is a two-dimensional barcode.

20. A non-transitory computer-readable storage medium storing a program executable by a processor to perform:
obtaining attribute information of multimedia information that is associated with a multimedia provider, the attribute information including website information of a website used to display the multimedia information and identifier (ID) information associated with the multimedia information;
generating a machine-readable identification code to be scanned by a user device of a user based on at least the web site information;
obtaining a first image corresponding to the multimedia information based on the ID information;
determining an image area in the first image in which the machine-readable identification code is to be inserted;
inserting the machine-readable identification code into the image area of the first image to generate a second image that includes the machine-readable identification code;
generating a first delivery request that includes the first image and a corresponding first delivery rule and send the first delivery request to a multimedia delivery platform that delivers the multimedia information, the first delivery rule indicating that the first image is to be delivered to the user device which is a mobile device; and
generating a second delivery request that includes the second image and a corresponding second delivery rule and send the second delivery request to the multimedia delivery platform, the second delivery rule indicating that the second image is to be delivered to a non-mobile display device.

* * * * *